(12) United States Patent
Lee et al.

(10) Patent No.: US 11,665,032 B2
(45) Date of Patent: May 30, 2023

(54) METHOD AND APPARATUS FOR MODULATING/DEMODULATING AN FSK SIGNAL

(71) Applicant: Korea Advanced Institute of Science and Technology, Daejeon (KR)

(72) Inventors: Sang-Gug Lee, Daejeon (KR); Eui-Rim Jeong, Daejeon (KR); Jinho Ko, Daejeon (KR); Keun-Mok Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/619,353

(22) PCT Filed: Sep. 25, 2019

(86) PCT No.: PCT/KR2019/012446
§ 371 (c)(1),
(2) Date: Dec. 15, 2021

(87) PCT Pub. No.: WO2020/256222
PCT Pub. Date: Dec. 24, 2020

(65) Prior Publication Data
US 2022/0239535 A1 Jul. 28, 2022

(30) Foreign Application Priority Data
Jun. 17, 2019 (KR) .................. 10-2019-0071390

(51) Int. Cl.
*H04L 27/00* (2006.01)
*H04L 27/10* (2006.01)
(52) U.S. Cl.
CPC .......... *H04L 27/0006* (2013.01); *H04L 27/10* (2013.01)

(58) Field of Classification Search
CPC ................. H04L 27/10; H04L 27/0006; H04L 2027/0026; H04L 27/00
(Continued)

(56) References Cited

U.S. PATENT DOCUMENTS 4,068,198 A * 1/1978 Otto ..................... H03C 3/0933
331/25
5,790,555 A * 8/1998 Narahashi ............... H04L 27/10
370/480
(Continued)

FOREIGN PATENT DOCUMENTS

JP H 02-243011 A 9/1990
JP 2019-068154 A 4/2019
(Continued)

OTHER PUBLICATIONS

International Search Report (with English Translation) dated Mar. 16, 2020 for International Application No. PCT/KR2019/012446; 4 Pages.

*Primary Examiner* — Qutbuddin Ghulamali
(74) *Attorney, Agent, or Firm* — Daly Crowley Mofford & Durkee, LLP (57) ABSTRACT

A method and apparatus for modulating/demodulating an FSK signal capable of overcoming a trade-off relationship between a modulation index and a spectral efficiency are disclosed. An apparatus for modulating/demodulating a frequency deviation keying (FSK) signal includes a channel selection-modulator, a phase locked loop, and an output unit. The channel selection-modulator modulates an FSK signal by setting a frequency channel to be used. The phase locked loop generates a desired output frequency 'fout' compared to a reference frequency '$f_{REF}$' by adjusting a frequency division ratio (N+n) with respect to a frequency of the modulated FSK signal. The output unit amplifies the FSK signal having the generated output frequency 'fout' and radiating
(Continued)

the amplified FSK signal through an antenna. Here, each of the frequency channels is divided into two or more tones, and different frequency channels are allocated between the tones divided into two or more tones.

10 Claims, 8 Drawing Sheets

(58) Field of Classification Search
USPC .......... 375/262, 334–337, 272–278
See application file for complete search history.

(56) References Cited

U.S. PATENT DOCUMENTS

| | | | |
|---|---|---|---|
| 10,211,927 B1* | 2/2019 | Ishihara | H03C 3/0933 |
| 2008/0112519 A1* | 5/2008 | Jung | H04B 1/30 |
| | | | 375/350 |
| 2010/0194486 A1* | 8/2010 | Lang | H04L 27/12 |
| | | | 332/100 |
| 2014/0308048 A1* | 10/2014 | Roberts | H04B 10/60 |
| | | | 398/187 |
| 2015/0270904 A1* | 9/2015 | Jiang | H04B 10/506 |
| | | | 398/79 |
| 2015/0341195 A1* | 11/2015 | Kuba | H04L 27/14 |
| | | | 375/303 |

FOREIGN PATENT DOCUMENTS

| | | |
|---|---|---|
| KR | 10-0216364 B1 | 8/1999 |
| KR | 10-0793059 B1 | 1/2008 |
| KR | 2017-0056466 A | 5/2017 |

* cited by examiner

METHOD AND APPARATUS FOR MODULATING/DEMODULATING AN FSK SIGNAL

CROSS REFERENCE TO RELATED APPLICATIONS

This application is a U.S. National Phase of International Application Number PCT/KR2019/012446, filed on Sep. 25, 2019, and claims priority under 35 U.S.C. § 119 to Korean Patent Application No. 10-2019-0071390, filed on Jun. 17, 2019 in the Korean Intellectual Property Office (KIPO), the contents of which are herein incorporated by reference in their entirety.

BACKGROUND OF THE INVENTION

Technical Field

Exemplary embodiments of the present invention relate to a method and apparatus for modulating/demodulating a frequency-shift keying (FSK) signal. More particularly, exemplary embodiments of the present invention relate to a method and apparatus for modulating/demodulating an FSK signal capable of overcoming a trade-off relationship between a modulation index and a spectral efficiency.

Discussion of the Related Art

Frequency-shift keying (FSK) is a modulation scheme in which information is loaded on the frequency of a sine wave used as a carrier wave. That is, two frequencies of a sine wave having a constant amplitude are set, for example, and as data changes to 1 or 0, the allocated frequency among the two frequencies is transmitted to the other side. At the receiving end, the received signal is made to the original 1 or 0 state as promised. The simplest FSK is binary FSK (BFSK). BFSK uses a pair of discrete frequencies to transmit binary information (consisting of 0's and 1's). In BFSK, "1" is called the mark frequency, and "0" is called the space frequency.

In a wireless communication technology using a conventional FSK modulation, in order to maximize spectral efficiency, a frequency scheme (or channel allocation scheme) that minimizes a modulation index has been oriented. That is, the bandwidth was minimized while achieving the target transmission speed. When designed in this way at a low transmission rate, a bit error ratio (BER) performance is lowered in the fading channel because the signal bandwidth is small.

When the modulation index is increased in order to overcome this disadvantage, the bandwidth is increased and the spectral efficiency is decreased.

FSK is a frequency modulation scheme for transmitting digital data by discretely changing the frequency of a carrier wave. That is, FSK is a method of transmitting digital information by transmitting a signal at a specific frequency according to a digital data value. In order to transmit 1 bit at a time, binary frequency-shift keying (BFSK), that is two frequencies is required, and 4-FSK using four frequencies is used to transmit 2 bits at the same time.

In BFSK, a modulation index 'h' is defined as a ratio between an interval between two tones and a data transmission rate as shown in Equation 1 below.

$$h = 2\Delta f / f_{DR} \quad \text{[Equation 1]}$$

Here, $\Delta f$ is a frequency deviation from a carrier frequency, and $f_{DR}$ is a data speed (or a data rate).

Here, when a frequency interval '2f' between two tones is sufficiently larger than a coherence bandwidth of a fading channel, a diversity gain may be obtained. When a diversity gain may be obtained, the BER performance at a receiver may be greatly improved.

However, when a frequency interval between two tones is narrowed in order to increase channel efficiency in BFSK of a low data rate, no diversity gain may be obtained such that communication may be often cut off. Therefore, in BFSK of a low data rate, it is advantageous for communication performance in a fading channel to have a large modulation index.

The above contents may be briefly described with reference to FIG. 1.

Figure 1:
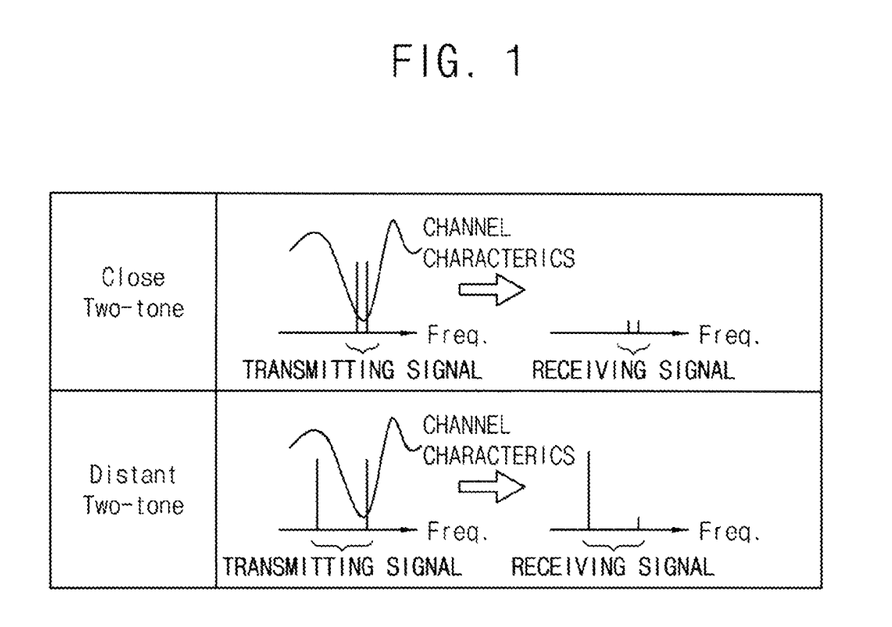
FIG. 1 is a view explaining a transmission/reception signal corresponding to each of two-tones adjacent to each other and two-tones spaced apart from each other.

FIG. 1 is a view explaining a transmission/reception signal corresponding to each of two-tones adjacent to each other and two-tones spaced apart from each other. As shown in FIG. 1, in the case of close two-tones, a reception power is greatly affected in a fading channel, whereas in the case of distant two-tones, stable communication is possible the fading channel.

Figure 2:
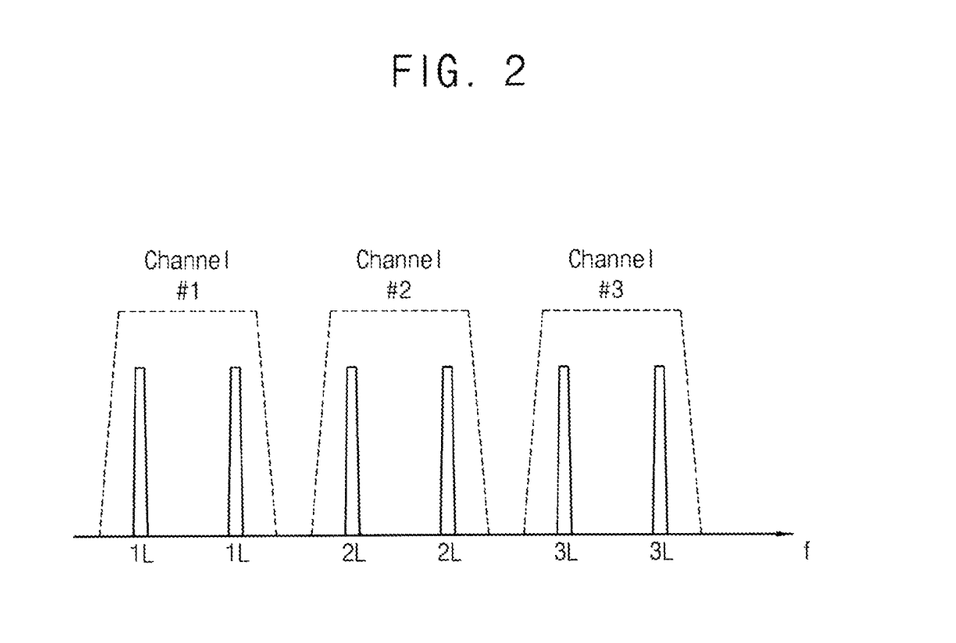
FIG. 2 is a diagram schematically explaining a frequency spectrum allocated to a frequency channel in a conventional manner.

In a conventional frequency channel allocation method, all channels are sequentially allocated as shown in FIG. 2 below.

FIG. 2 is a diagram schematically explaining a frequency spectrum allocated to a frequency channel in a conventional manner. As shown in FIG. 2, a first low frequency 1L and a first high frequency 1H corresponding to a first channel Channel #1 are allocated, and a second low frequency 2L and a second high frequency 2H corresponding to a second channel Channel #2 are allocated. In addition, a third low frequency 3L and a third high frequency 3H corresponding to the third channel Channel #3 are allocated. Here, a first high frequency 1H is greater than a first low frequency 1L, a second low frequency 2L is greater than the first high frequency 1H, and a second high frequency 2H is greater than the second low frequency 2L. Moreover, a third low frequency 3L is greater than the second high frequency 2H, and a third high frequency 3H is greater than a third low frequency 3L.

When a gap between two tones in BFSK is large, a channel bandwidth is widened by the large gap. Thus, a number of channels within an overall usable frequency range is reduced, which reduces a spectral efficiency (bps/Hz).

SUMMARY

Exemplary embodiments of the present invention provide an FSK signal modulation/demodulation method allocating a channel so as not to sacrifice spectral efficiency even if an interval between two tones is wide in FSK.

Exemplary embodiments of the present invention also provide an FSK signal modulation/demodulation apparatus performing the above-mentioned FSK signal modulation/demodulation method.

However, the problem to be solved by the present invention is not limited to the above-mentioned problems, and may be variously expanded without departing from the spirit and scope of the present invention.

According to exemplary embodiments of the present invention for achieving the above-mentioned task of the present invention, the method for modulating/demodulating a frequency deviation keying (FSK) signal includes the steps of: (a) modulating an FSK signal by setting a frequency channel to be used; (b) generating a desired output frequency 'fout' compared to a reference frequency '$f_{REF}$' by adjusting a frequency division ratio (N+n) with respect to a frequency of the modulated FSK signal; and (c) amplifying the FSK signal having the generated output frequency 'fout' and radiating the amplified FSK signal through an antenna, wherein each of the frequency channels is divided into two or more tones, and different frequency channels are allocated between the tones divided into two or more tones.

In an embodiment of the present invention, the FSK signal may be a binary frequency shift keying (BFSK) signal. Here, the step (a) may include: (a-1) summing up a channel selection signal (CHSEL<15:0>) set to bits corresponding to the center frequency 'fc' of the channel to be used according to the channel method and an offset signal (OFFSET<8:0>) set to bit that sets the frequency deviation 'Δf' to 1 MHz; (a-2) subtracting the offset signal (OFFSET<8:0>) from the channel selection signal (CHSEL<15:00>); and (a-3) outputting either bits corresponding to a sum frequency 'fc+Δf' of the center frequency and a frequency deviation or bits corresponding to a difference frequency 'fc−Δf' between the center frequency and the frequency deviation 'Δf' according to a transmission data (TXDATA).

In an embodiment of the present invention, the step (b) may include: (b-1) converting a 16-bit modulated signal into a 3-bit modulated signal; (b-2) distributing a 3-bit modulated signal to an output frequency 'fout' to generate a division frequency 'fdiv'; (b-3) detecting a phase by receiving the frequency division frequency 'fdiv' and a reference frequency '$f_{REF}$' provided from an external device; (b-4) receiving a phase difference signal to charge-pump the phase difference signal; and (b-5) removing a high-frequency component of the charge-pumped signal.

In an embodiment of the present invention, the method for modulating/demodulating a frequency deviation keying (FSK) signal may further include the steps of: (d) amplifying the sum component of the center frequency 'fc' and the frequency deviation 'Δf' of the BFSK-modulated input signal input through an antenna and the difference component between the center frequency 'fc' and the frequency deviation 'Δf', respectively; (e) lowering a frequency of the amplified sum component and difference component to the frequency deviation 'Δf' using an I/Q mixer with respect to the oscillator frequency 'fLO' corresponding to the selected channel; (f) removing a signal having a frequency lower than the frequency deviation 'Δf' and a signal having a higher frequency than the frequency deviation 'Δf' to amplify a signal at the frequency deviation 'Δf'; (g) demodulating the amplified signal; and (h) analog-to-digital converting the demodulated signal.

In an embodiment of the present invention, the step (g) may include: (g-1) separating a positive frequency deviation '+Δf' from a negative frequency deviation '−Δf' by removing an image component from a bandpass filtered signal; (g-2) obtaining an energy of each of the positive frequency deviation '+Δf' and the negative frequency deviation '−Δf'; and (g-3) obtaining an energy difference between the energy of the positive frequency deviation '+Δf' and the negative frequency deviation '−Δf'.

In an embodiment of the present invention, the output frequency 'fout' may be composed of the sum of the center frequency and the frequency deviation 'fc+Δf' and the difference between the center frequency and the frequency deviation 'fc−Δf', and an interval of adjustable frequency of the center frequency is determined by dividing the reference frequency '$f_{REF}$' by a number of available digital bits.

According to another aspect of the present invention, an apparatus for modulating/demodulating a frequency deviation keying (FSK) signal includes a channel selection-modulator, a phase locked loop, and an output unit. The channel selection-modulator modulates an FSK signal by setting a frequency channel to be used. The phase locked loop generates a desired output frequency 'fout' compared to a reference frequency '$f_{REF}$' by adjusting a frequency division ratio (N+n) with respect to a frequency of the modulated FSK signal. The output unit amplifies the FSK signal having the generated output frequency 'fout' and radiating the amplified FSK signal through an antenna. Here, each of the frequency channels is divided into two or more tones, and different frequency channels are allocated between the tones divided into two or more tones.

In an embodiment of the present invention, the FSK signal may be a binary frequency shift keying (BFSK) signal. Here, the channel selection-modulator may include a summer, a subtractor and a multiplexer. The summer sums up a channel selection signal (CHSEL<15:0>) set to bits corresponding to the center frequency 'fc' of the channel to be used according to the channel method and an offset signal (OFFSET<8:0>) set to bit that sets the frequency 'f' to 1 MHz. The subtractor subtracts the offset signal (OFFSET<8:0>) from the channel selection signal (CHSEL<15:00>). The multiplexer outputs either bits corresponding to a sum frequency 'fc+Δf' of the center frequency 'fc' and a frequency deviation 'Δf' or bits corresponding to a difference frequency 'fc−Δf' between the center frequency and the frequency deviation 'Δf' according to a transmission data (TXDATA).

In an embodiment of the present invention, the phase locked loop may include a delta-sigma-modulator, a divider, a phase-frequency detector, a charge pump, and a loop filter. The delta-sigma-modulator converts a 16-bit modulated signal into a 3-bit modulated signal. The divider distributes a 3-bit modulated signal to an output frequency 'fout' to generate a division frequency 'fdiv'. The phase-frequency detector detects a phase by receiving the frequency division frequency 'fdiv' and a reference frequency '$f_{REF}$' provided from an external device. The charge pump receives a phase difference signal to charge-pump the phase difference signal. The loop filter removes a high-frequency component of the charge-pumped signal.

In an embodiment of the present invention, the apparatus may further include a low-noise amplifier, an I/Q mixer unit, a band-pass filter unit, a demodulator, and an analog-to-digital converter. The low-noise amplifier amplifies the sum component of the center frequency 'fc' and the frequency deviation 'Δf' of the BFSK-modulated input signal input through an antenna and the difference component between the center frequency 'fc' and the frequency deviation 'Δf', respectively. The I/Q mixer unit lowers a frequency of the amplified sum component and difference component to the frequency deviation 'Δf' using an I/Q mixer with respect to the oscillator frequency '$f_{LO}$' corresponding to the selected channel. The band-pass filter unit removes a signal having a frequency lower than the frequency deviation 'Δf' and a signal having a higher frequency than the frequency deviation 'Δf' to amplify a signal at the frequency deviation 'Δf'. The demodulator demodulates the amplified signal. The analog-to-digital converter analog-to-digital converts the demodulated signal.

In an embodiment of the present invention, the demodulator may further include a polyphase filter, an envelope detector, and a subtractor. The polyphase filter separates a positive frequency deviation '+Δf' from a negative frequency deviation '−Δf' by removing an image component from a bandpass filtered signal. The envelope detector obtains an energy of each of the positive frequency deviation '+Δf' and the negative frequency deviation '−Δf'. The subtractor obtains an energy difference between the energy of the positive frequency deviation '+Δf' and the negative frequency deviation '−Δf'.

In an embodiment of the present invention, the output frequency 'fout' may be composed of the sum of the center frequency and the frequency deviation 'fc+Δf' and the difference between the center frequency and the frequency deviation 'fc−Δf', and an interval of adjustable frequency of the center frequency is determined by dividing the reference frequency '$f_{REF}$' by a number of available digital bits.

According to exemplary embodiments of the present invention, during FSK modulation, each of the frequency channels is divided into two or more tones, and tones corresponding to other frequency channels are allocated therebetween. Accordingly, it is possible to improve spectral efficiency while improving the BER performance in a fading channel by increasing a modulation index for a BFSK wireless communication system having a low data transmission rate.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Although the present invention may be applied to both M-FSK, only BFSK is described for easy explanation. However, a same concept may be easily extended to any M-FSK.

Hereinafter, an example of an implementation of the present invention is described, but the scope of the invention is not limited to an example implementation below.

In the present embodiment, a frequency band will be described as an example of 902-928 MHz ISM band, which is a frequency band commonly used in IoT networks. When a data rate is 250 kbps and a frequency deviation 'f' is 1 MHz, the case where a modulation scheme is BFSK will be described. The reason why the frequency deviation is widely set to 1 MHz is that a bit error rate (BER) characteristic of the fading channel is good.

Figure 3:
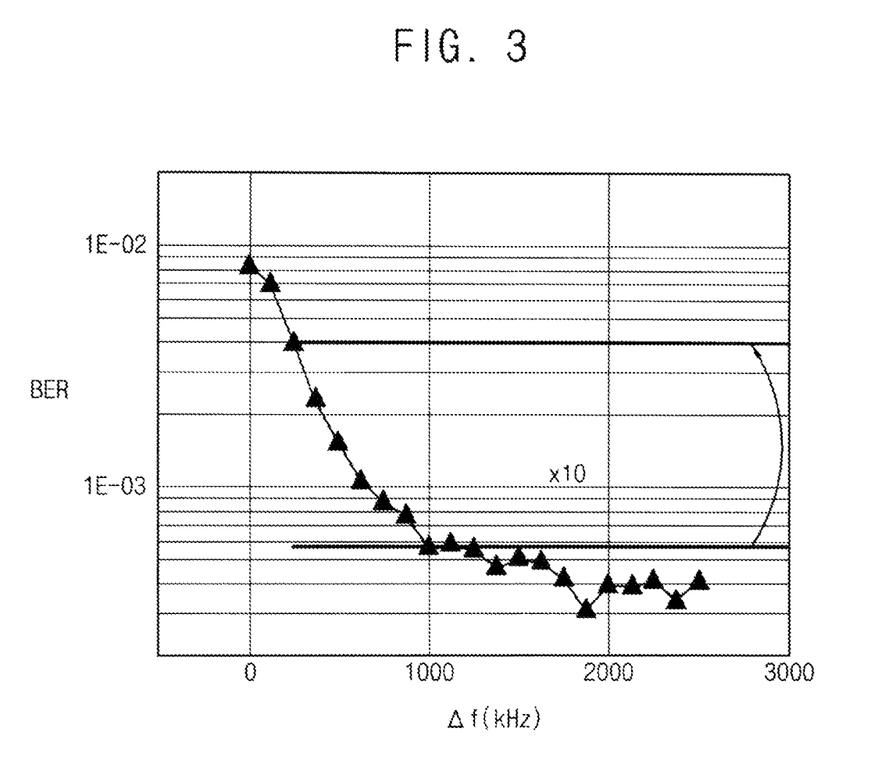
FIG. 3 shows a simulation result of the BER according to a frequency deviation 'Δf'.

FIG. 3 shows a simulation result of the BER according to a frequency deviation 'Δf'.

Referring to FIG. 3, a simulation was performed in a condition that BFSK signal having a frequency of about 915 MHz passes through an International Telecommunication Union (ITU) outdoor-outdoor channel at a transmission rate of 250 kbps and is demodulated by an ideal non-coherent receiver. The ITU outdoor-outdoor channel model well represents an actual channel environment including the fading effect. The BER is 10 times better when a frequency deviation 'Δf' is 1 MHz than when a frequency deviation 'Δf' is about 250 kHz.

Hereinafter, frequency allocation according to the present invention will be described.

When the frequency allocation scheme proposed by the present invention is applied to the frequency band and modulation scheme defined as described above, frequencies may be exemplarily allocated as shown in Table 1 below. Here, the center frequency 'fc' means a frequency at a center of two tones (i.e., a frequency of a 0 signal and a frequency of a 1 signal) within one channel.

TABLE 1

| Channel Number | Center frequency fc |
|---|---|
| CH1 | 903.25 |
| CH2 | 903.75 |
| CH3 | 904.25 |
| CH4 | 904.75 |
| CH5 | 907.25 |
| CH6 | 907.75 |
| CH7 | 908.25 |
| CH8 | 908.75 |
| CH9 | 911.25 |
| CH10 | 911.75 |

TABLE 1-continued

| Channel Number | Center frequency fc |
|---|---|
| CH11 | 912.25 |
| CH12 | 912.75 |
| CH13 | 915.25 |
| CH14 | 915.75 |
| CH15 | 916.25 |
| CH16 | 916.75 |
| CH17 | 919.25 |
| CH18 | 919.75 |
| CH19 | 920.25 |
| CH20 | 920.75 |
| CH21 | 923.25 |
| CH22 | 923.75 |
| CH23 | 924.25 |
| CH24 | 924.75 |

Referring to Table 1, a center frequency 'fc' of the channel number CH1 is allocated to about 903.25 MHz, a center frequency 'fc' of the channel number CH2 is allocated to about 903.75 MHz, a center frequency 'fc' of the channel number CH3 is allocated to about 904.25 MHz, and a center frequency 'fc' of the channel number CH4 is allocated to about 904.75 MHz. In this way, a center frequency 'fc' of the channel number CH21 is allocated to about 923.25 MHz, a center frequency 'fc' of the channel number CH22 is allocated to about 923.75 MHz, a center frequency 'fc' of the channel number CH23 is allocated to about 924.25 MHz, and a center frequency 'fc' of the channel number CH24 is allocated to about 924.75 MHz.

Figure 4:
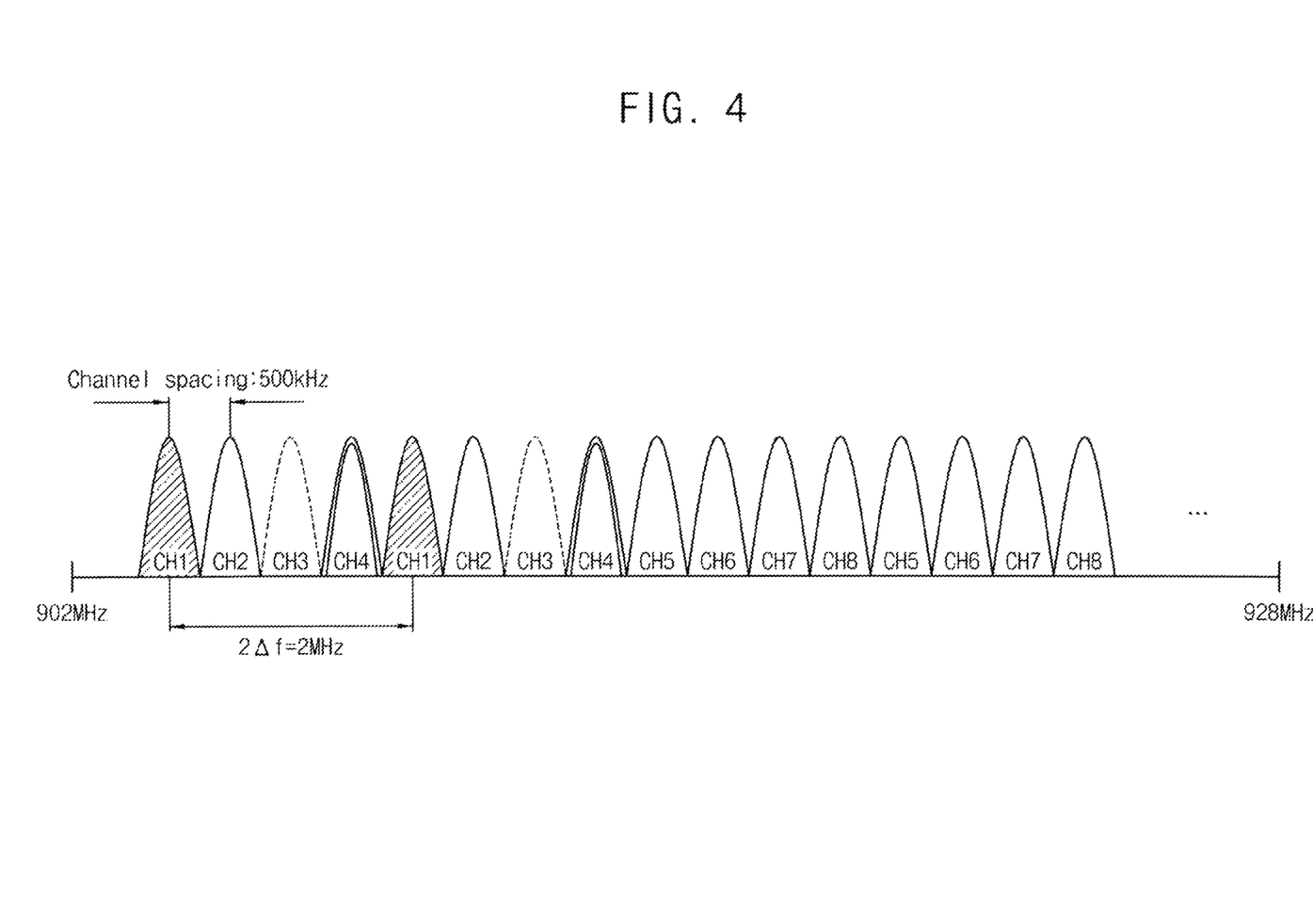
FIG. 4 is a diagram schematically illustrating a center frequency allocated to a channel shown in Table 1.

When the above is easily illustrated in the frequency domain, it may be represented as shown in FIG. 4.

FIG. 4 is a diagram schematically illustrating a center frequency 'fc' allocated to a channel shown in Table 1 exemplified according to a frequency allocation method according to the present invention.

Referring to FIG. 4, in the case of BFSK, one frequency channel is divided into two tones, and a width of a channel band is 1 MHz. A total number of channels is twenty-four. An interval between center frequencies 'fc' is about 500 kHz. Thus, three channels are positioned between two tones corresponding to one channel.

In contrast, when a general frequency allocation method is adopted, only 10 channels may be allocated as shown in Table 2 below. An interval between the center frequencies 'fc' is about 2.5 MHz.

TABLE 2

| Channel Number | Center frequency fc |
|---|---|
| CH1 | 903.25 |
| CH2 | 905.75 |
| CH3 | 908.25 |
| CH4 | 910.75 |
| CH5 | 913.25 |
| CH6 | 915.75 |
| CH7 | 918.25 |
| CH8 | 920.75 |
| CH9 | 923.25 |
| CH10 | 925.75 |

Referring to Table 1, a center frequency 'fc' of the channel number CH1 is allocated to about 903.25 MHz, a center frequency 'fc' of the channel number CH2 is allocated to about 905.75 MHz, a center frequency 'fc' of the channel number CH3 is allocated to about 908.25 MHz, and a center frequency 'fc' of the channel number CH4 is allocated to about 910.75 MHz. A center frequency 'fc' of the channel number CH5 is allocated to about 913.25 MHz, a center frequency 'fc' of the channel number CH6 is allocated to about 915.75 MHz, a center frequency 'fc' of the channel number CH7 is allocated to about 918.25 MHz, and a center frequency 'fc' of the channel number CH8 is allocated to about 920.75 MHz. A center frequency 'fc' of the channel number CH9 is allocated to about 923.25 MHz, and a center frequency 'fc' of the channel number CH10 is allocated to about 925.75 MHz.

Figure 5:
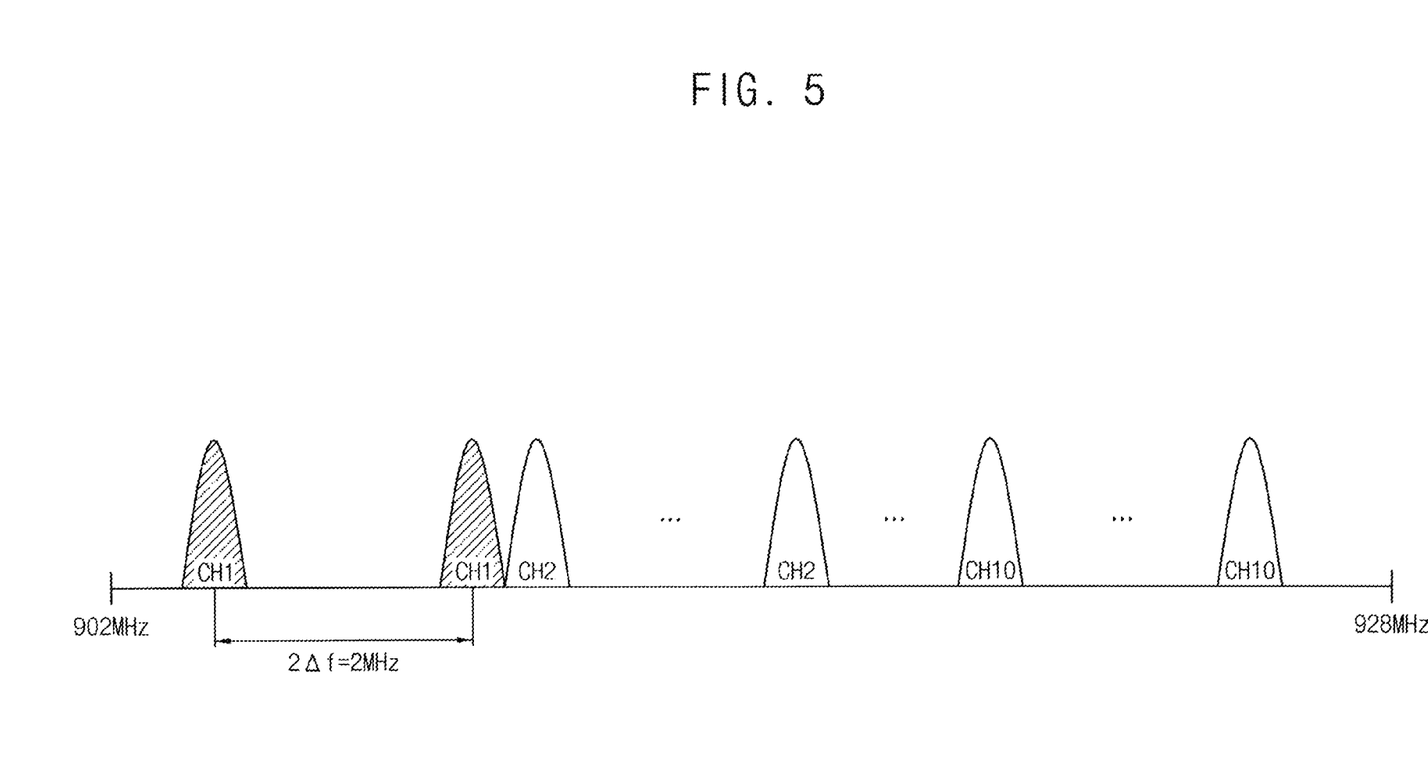
FIG. 5 is a diagram schematically illustrating a center frequency allocated to a channel shown in Table 2.

When the above is easily illustrated in the frequency domain, it may be represented as shown in FIG. 5.

FIG. 5 is a diagram schematically illustrating a center frequency allocated to a channel shown in Table 2 exemplified according to a general frequency allocation method.

Referring to FIG. 5, in the case of BFSK, one channel is divided into two tones, and a width of the channel band is 1 MHz. A total number of channels is ten. An interval between center frequencies 'fc' is 2 MHz. Therefore, no channel is positioned between two tones corresponding to one channel. For example, no channel is allocated between a tone corresponding to 0 and a tone corresponding to 1 of channel number CH1, and no channel is allocated between a tone corresponding to 0 and a tone corresponding to 1 of channel number CH2. In this way, no channel is allocated between a tone corresponding to 0 and a tone corresponding to 1 of channel number CH10.

Then, a BFSK signal modulation/demodulation apparatus employing a frequency channel allocation technique in FSK will be described below.

Figure 6:
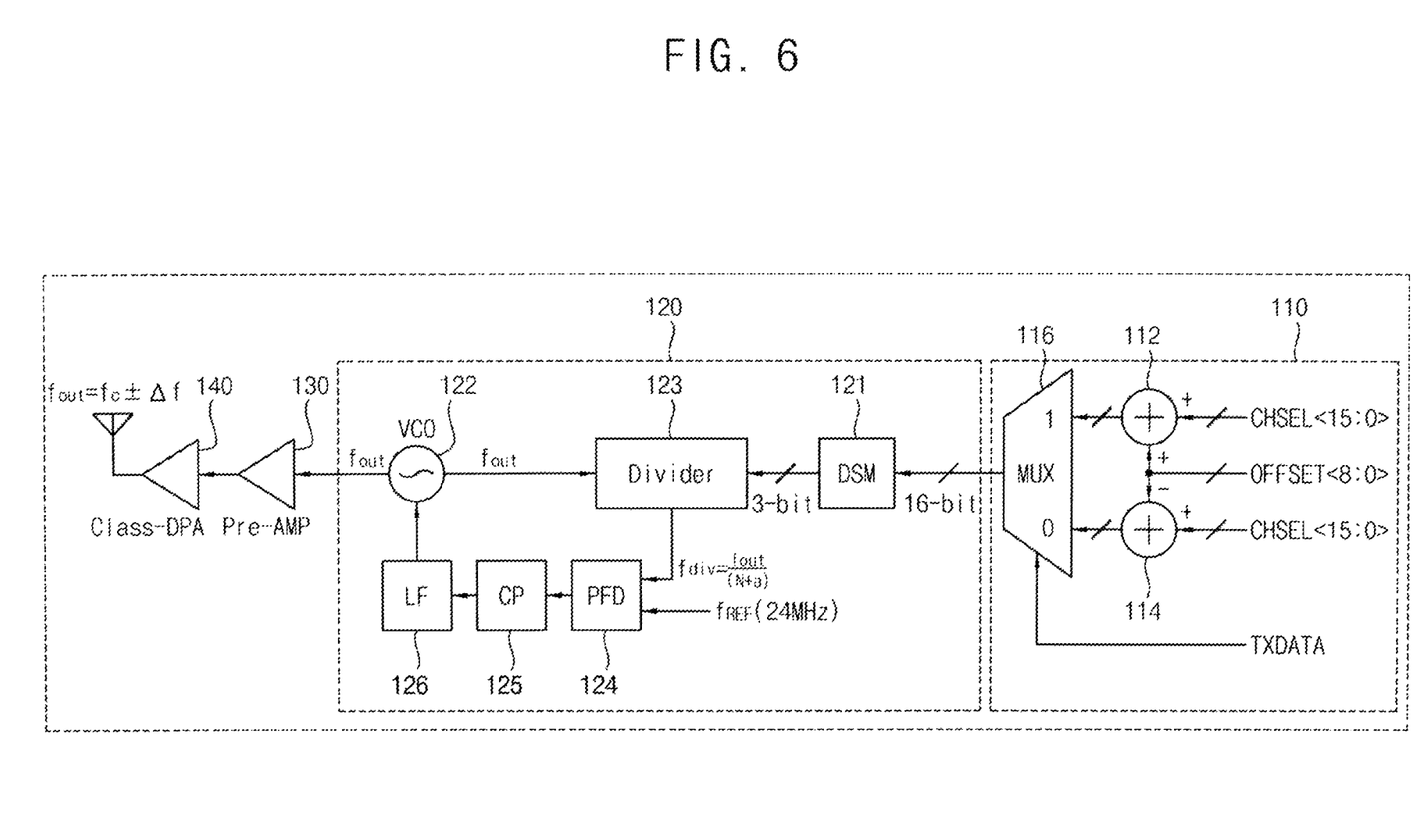
FIG. 6 is a block diagram explaining a split channel BFSK transmitter as an FSK signal modulation and demodulation apparatus according to an embodiment of the present invention.

FIG. 6 is a block diagram explaining a split channel BFSK transmitter as an FSK signal modulation and demodulation apparatus according to an embodiment of the present invention. In particular, a BFSK transmitter employing a phase-locked loop (PLL) based modulation method is shown.

Referring to FIG. 6, a split channel BFSK transmitter according to an embodiment of the present invention includes a channel selector and modulator 110, a phase-locked loop (PLL) 120, a pre-amplifier (Pre-AMP) 130 and a power amplifier (PA) 140, and supports a frequency allocation scheme.

The channel selector-modulator 110 includes a summer 112, a subtractor 114 and a multiplexer 116. The channel selector-modulator 110 determines an output channel of a transmission data TXDATA to be used, modulates a BFSK signal and provides it to the phase-locked loop 120.

The summer 112 sums a channel selection signal CHSEL and an offset signal OFFSET, and provides them to a first input part 1 of the mux 116. In the present embodiment, the channel selection signal CHSEL is 16-bit data, and the offset signal OFFSET is 9-bit data. For example, the summer 112 sums the channel selection signal CHSEL<15:0> set to bits corresponding to the center frequency 'fc' of the channel to be used according to the channel method and the offset signal OFFSET<8:0> set to a bit setting the frequency deviation 'Δf' to 1 MHz, and provides the summed value to the mux 116.

The subtractor 114 subtracts the offset signal OFFSET from the channel selection signal CHSEL and provides it to a second input part 0 of the multiplexer 116. For example, the subtractor 114 subtracts the offset signal OFFSET<8:0> from the channel selection signal CHSEL<15:0>, and provides the subtracted value to the multiplexer 116.

The multiplexer 116 provides either one of a signal provided from the summer 112 and a signal provided from the subtractor 114 based on an externally provided transmission data TXDATA to the phase locked loop 120. For example, the multiplexer 116 outputs any one of bits corresponding to the frequency 'fc+Δf' of the sum of the center frequency and the frequency deviation and bits corresponding to the frequency 'fc−Δf' of the difference between the center frequency and the frequency deviation to the phase locked loop 120.

The phase locked loop 120 includes a delta-sigma modulator (DSM) 121, a voltage-controlled oscillator (VCO) 122, a frequency divider 123, a phase-frequency detector (PFD) 124, a charge pump (CP) 125, and a loop filter (LF) 126, and adjusts a frequency division ratio (N+n) to generate a desired output frequency 'fout' compared to a reference frequency 'fREF'. The phase locked loop 120 shown in FIG. 6 may be a fractional-N phase locked loop (PLL) using a fractional N-divider to enable finer tuning of an output frequency. Such fractional-N-PLLs may use a delta-sigma modulator (DSM) to determine the immediate divider ratios used by the N-divider.

The delta-sigma modulator 121 converts a 16-bit modulated signal into a 3-bit modulated signal. The delta-sigma modulator is a circuit corresponding to the PCM, as a type of controlled oscillation circuit that generates pulses so that an average value of a digital pulses is equal to an average value of an analog input values. The delta-sigma modulator may process wideband multi-bits without reducing a signal-to-noise ratio. In the present embodiment, the delta-sigma modulator 121 may include a second-order delta-sigma modulator. The second-order delta-sigma modulator may include a first integrator (not shown), a second integrator (not shown), an analog-to-digital converter (ADC) (not shown) and a digital-to-analog converter (DAC) (not shown). The second-order delta-sigma modulator is a circuit capable of minimizing quantization noise necessarily generated in the process of converting an analog signal into a digital signal in a required low frequency band, and is widely used in general analog-to-digital modulators. The delta-sigma modulator 121 has a characteristic in which the quantization noise reduction characteristic is improved as an oversampling ratio OSR is higher.

The frequency divider 123 generates a division frequency 'fdiv' by distributing 3-bit modulated signal to an output frequency 'fout'. The division frequency 'fdiv', which is an output of the frequency divider 123, and a reference frequency '$f_{REF}$' applied from an external device are synchronized to be the same. The reference frequency '$f_{REF}$' is generated from a crystal oscillator.

The phase-frequency detector 124 receives the division frequency 'fdiv' and the reference frequency '$f_{REF}$' to detect a phase.

The charge pump 125 charge-pumps an input phase difference signal and provides it to the loop filter 126.

The loop filter 126 removes a high-frequency component of the charge-pumped signal.

In the present embodiment, a frequency division ratio of the frequency divider 123 may be selected from a plurality of radio channels by an input terminal of the frequency divider 123. For example, when a reference frequency '$f_{REF}$' is 26 and a frequency division ratio of the frequency divider 123 is an integer, a frequency of the voltage-controlled oscillator (VCO) 122 may be changed in 26 steps. In applications that require stepping a frequency of the voltage-controlled oscillator (VCO) 122 in steps smaller than the steps of a reference frequency 'fREF', a fractional division ratio is needed. For example, the Bluetooth specification describes radio channels spaced by an interval of 1 between 2400 and 2480.

The fractional division ratio is implemented by a division control signal applied to the frequency divider 123 so that division is alternated between two or more frequency division ratios to obtain a desired average frequency division ratio. When the frequency divider 123 is set to divide two frequency division ratios, e.g., N for half the time and (N+1) for the other half, an average frequency division ratio will be (N+0.5). The loop filter 126 ideally provides a complete averaging function so that an output signal of the voltage-controlled oscillator (VCO) 122 does not jitter between $Nf_{REF}$ and $(N+1)f_{REF}$, but is constant at $(N+0.5)f_{REF}$. The ratio at which a frequency division ratio is switched is limited by the fact that an output of the frequency divider 123 may be changed only at the reference frequency 'fREF'.

As such, by adjusting a frequency division ratio (N+a) in the delta-sigma modulator 121 and the frequency divider 123, a desired output frequency 'fout' compared to the reference frequency '$f_{REF}$' may be created.

A signal having an output frequency 'fout' generated by the voltage-controlled oscillator 122 is amplified through the pre-amplifier 130 and the power amplifier PA and radiated through an antenna. The power amplifier PA 140 may have a Class-D type.

In the present embodiment, the channel selector-modulator 110 allocates a channel by adjusting the frequency division ratio N+a and modulates the BFSK signal. According to an allocated channel method, CHSEL<15:0> is set to bits corresponding to a center frequency (fc) of a channel, and OFFSET<8:0> is set to a bit that sets a frequency deviation 'Δf' to 1 MHz.

Bits corresponding to fc+Δf is applied to a first input part 1 of the mux 116, bits corresponding to fc−Δf is applied to a second input part 0 of the mux 116, and an output of the mux 116 is determined as one of two according to the transmission data TXDATA. Accordingly, the output of the channel selector-modulator 110 synchronizes the frequency of the phase-locked loop 120 to fc+Δf corresponding to the 1 signal of BFSK or fc−Δf corresponding to the 0 signal according to the transmission data TXDATA.

When the conventional BFSK was adopted, a center frequency 'fc' could only be adjusted in 2.5 MHz intervals. However, in order to support a split channel BFSK proposed in the present invention, a center frequency 'fc' should be adjustable at 500 kHz intervals. An adjustable center frequency 'fc' interval is determined by dividing the reference frequency '$f_{REF}$' (e.g., 24 MHz) by the number 216 of available digital bits applied to the delta-sigma modulator 121, which is about 366 Hz (=24 MHz/216) is sufficient.

Figure 7:
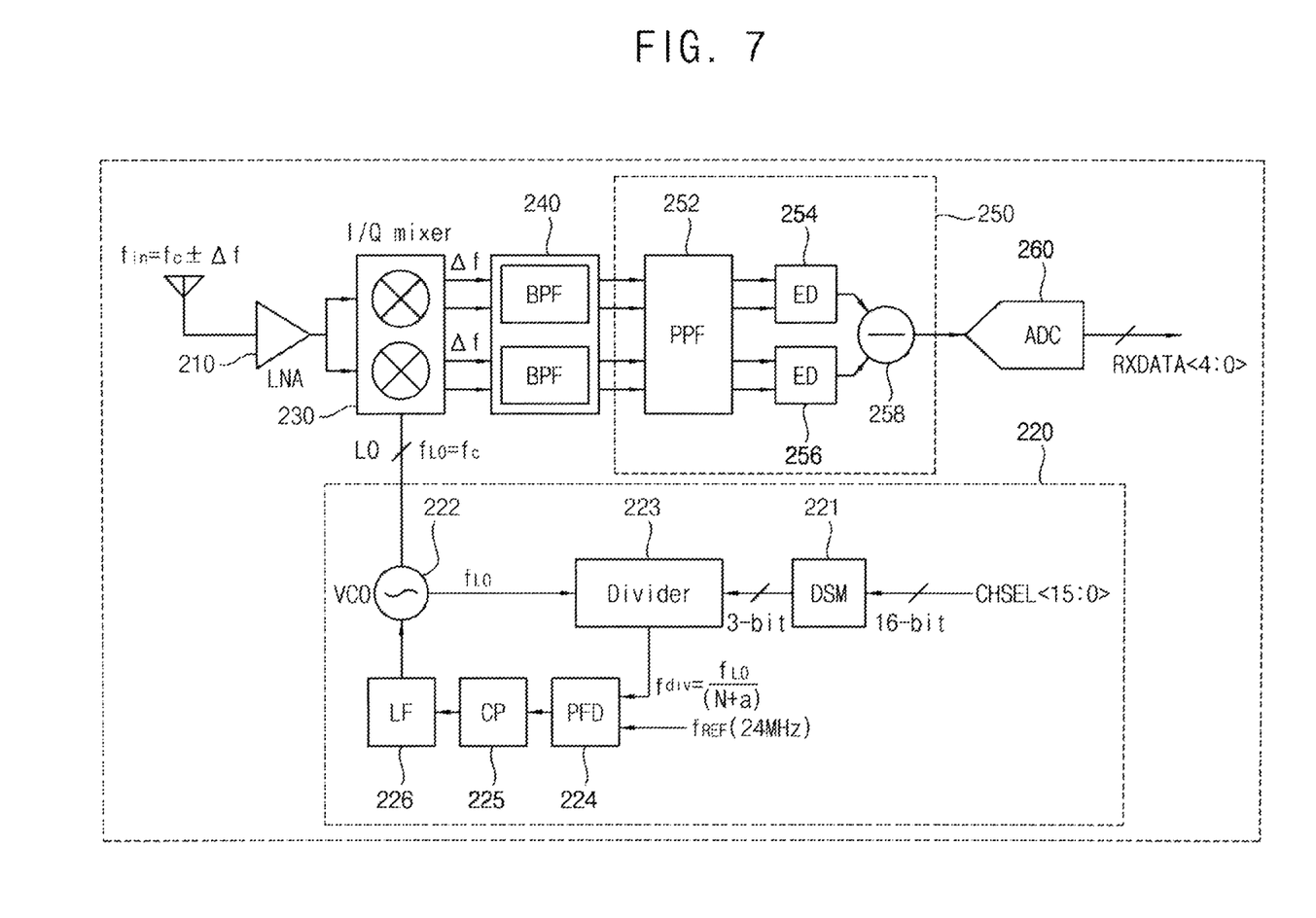
FIG. 7 is a block diagram explaining a split channel BFSK receiver as an FSK signal modulation and demodulation apparatus according to an embodiment of the present invention.
Figure 8A:
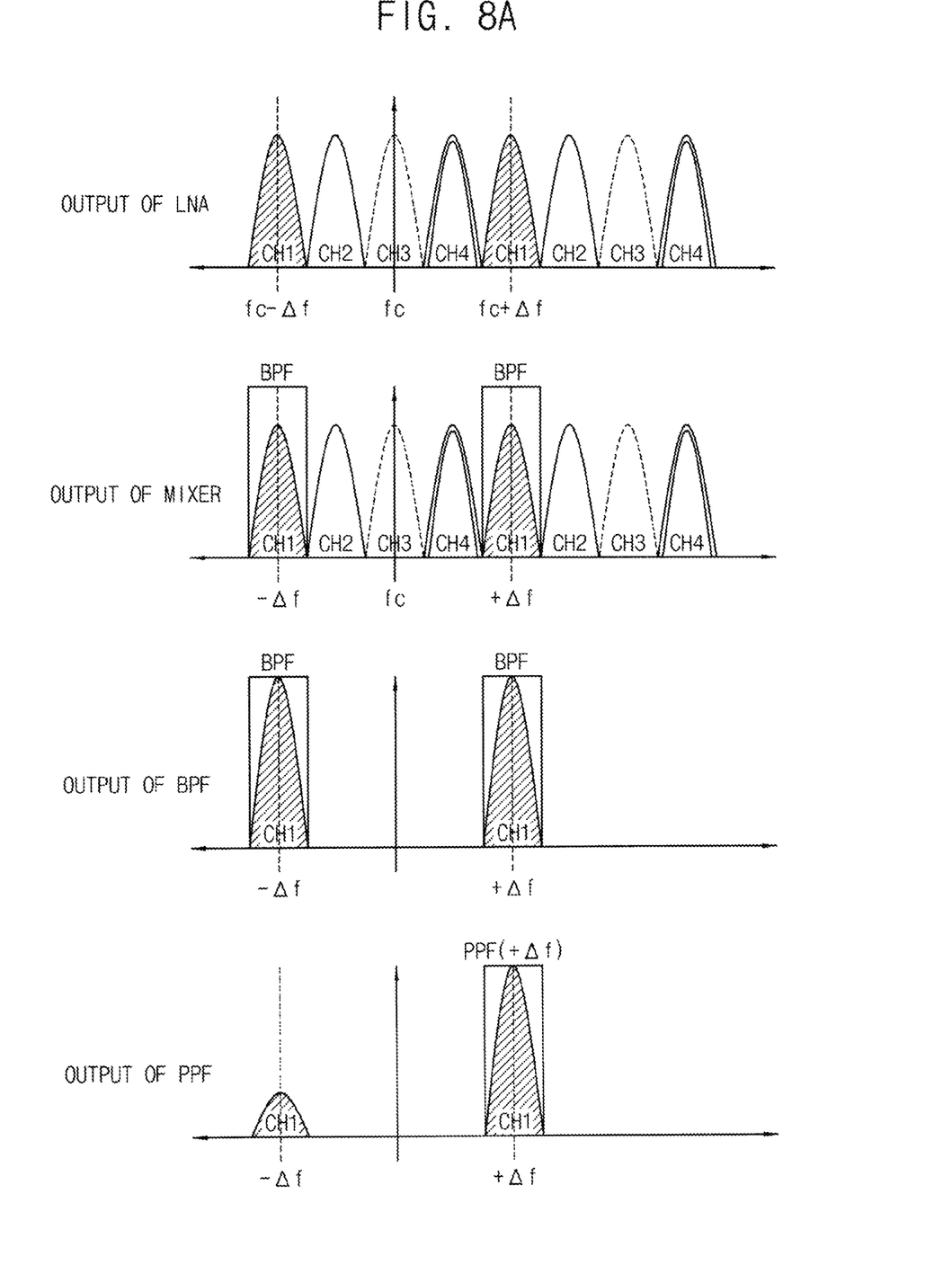
FIG. 8A is a diagram explaining a signal flow in components of the split channel BFSK receiver shown in FIG. 7.
Figure 8B:
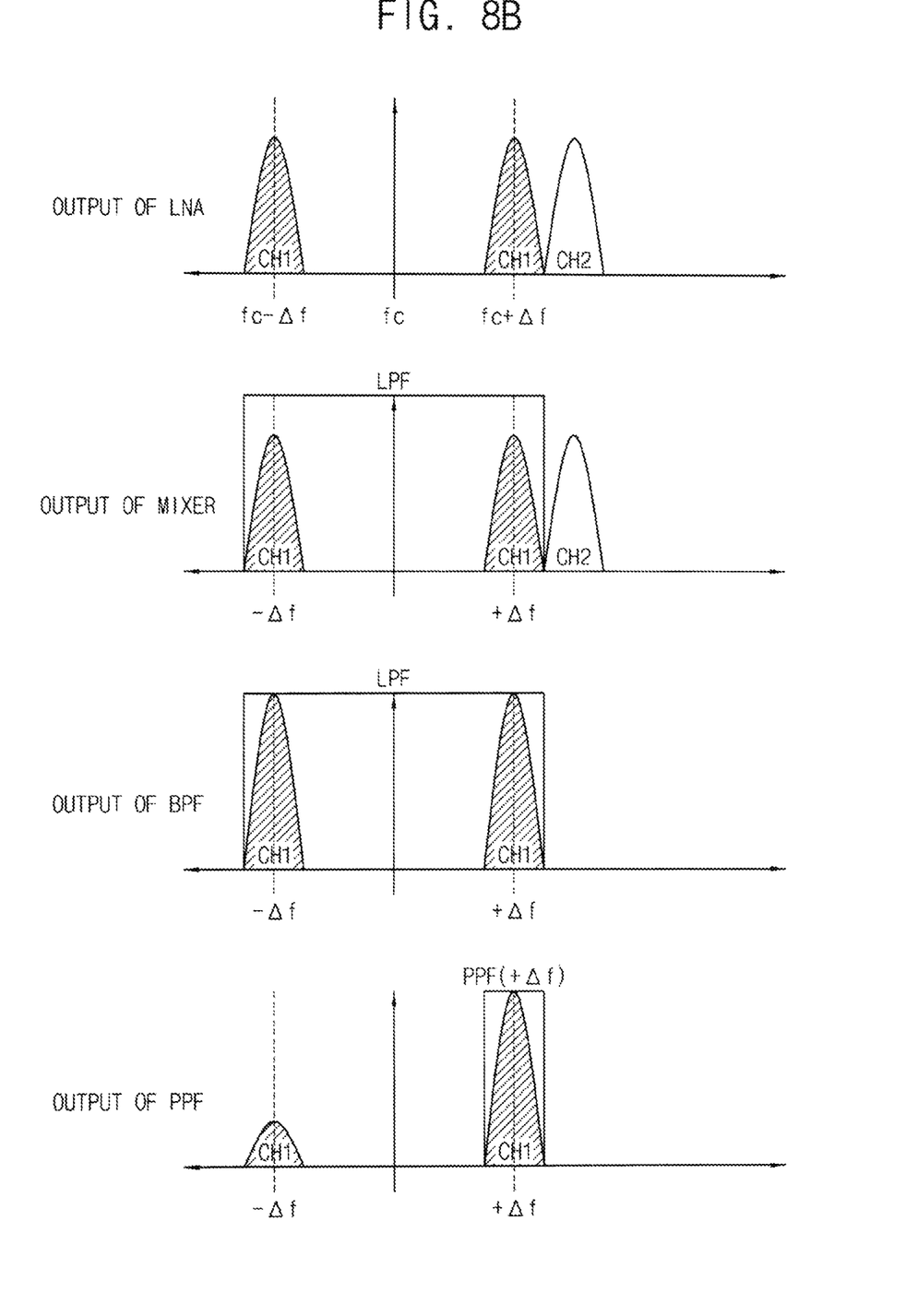
FIG. 8B is a diagram explaining a signal flow in components of a conventional BFSK receiver.

FIG. 7 is a block diagram explaining a split channel BFSK receiver as an FSK signal modulation and demodulation apparatus according to an embodiment of the present invention. FIG. 8A is a diagram explaining a signal flow in components of the split channel BFSK receiver shown in FIG. 7, and FIG. 8B is a diagram explaining a signal flow in components of a conventional BFSK receiver. In particular, a BFSK receiver is shown that employs frequency downlink based on direct conversion and non-coherent demodulation based on envelope detection. In the case of a typical BFSK receiver shown in FIG. 8B, a signal flow is shown in an example in which a low-pass filter is disposed between an I/Q mixer unit and a demodulator.

Referring to FIG. 7 to FIG. 8B, the split channel BFSK receiver according to an embodiment of the present invention includes a low noise amplifier 210, a phase locked loop (PLL) 220, an I/Q mixer unit 230, a bandpass filter unit 240, a demodulator 250 and an analog-to-digital converter 260, and supports frequency allocation schemes.

The low noise amplifier 210 amplifies each of a sum component of a center frequency 'fc' and a frequency deviation 'Δf' of a BFSK-modulated input signal input through an antenna and a difference component between the center frequency 'fc' and the frequency deviation 'Δf'.

Specifically, the low-noise amplifier 210 amplifies a BFSK-modulated input signal, which is a weak signal received by the antenna, into a signal of an appropriate level in order to process it at a rear end of the I/Q mixer unit 230 (or amplifies it with minimized noise), and provides the amplified signal to the I/Q mixer unit 230.

That is, the low-noise amplifier 210 receives the BFSK-modulated input signal in which one frequency channel is divided into two tones and tones of another frequency channel are placed between the divided tones, through an antenna, amplifies it with minimized noise, and provides it to the I/Q mixer 230. For example, in the case of the BFSK-modulated input signal input through an antenna, a mark frequency of a second frequency channel CH2, a mark frequency of a third frequency channel CH3 and a mark frequency of a fourth frequency channel CH4 may be disposed between two tones (that is, spacer frequency and mark frequency) corresponding to a first frequency channel CH1. In particular, the low noise amplifier 210 provides an input signal having a frequency fc+Δf centered on a center frequency 'fc' to an in-phase (I) mixer of the I/Q mixer unit 230, and provides an input signal having a frequency fc−Δf centered on the center frequency 'fc' to a quadrature phase (Q) of the I/Q mixer unit 230.

The phase locked loop (PLL) 220 includes a delta-sigma modulator (DSM) 221, a voltage controlled oscillator (VCO) 222, a frequency divider 223, a phase-frequency detector (PFD) 224, a charge pump (CP) 225 and a loop filter (LF) 226, and provides an oscillator frequency $f_{LO}$ as a center frequency 'fc' to the I/Q mixer unit 230. The phase locked loop 220 shown in FIG. 7 may have a structure of a fractional-N phase locked loop (Fraction-N PLL).

The I/Q mixer unit 230 lowers the frequencies of the amplified sum and difference components with the frequency deviation 'Δf' with the oscillator frequency fLO corresponding to the selected channel as a center.

Specifically, the I/Q mixer unit 230 includes an in-phase (I) mixer and a quadrature (Q) mixer. The I/Q mixer unit 230 mixes a frequency of the amplified BFSK-modulated input signal provided from the low-noise amplifier 210 and an oscillator frequency $f_{LO}$ provided from the phase-locked loop (PLL) 220. The in-phase (I) mixer mixes a frequency fc+f of the BFSK-modulated input signal and an oscillator frequency $f_{LO}$ provided from the phase-locked loop (PLL) 220 to down convert the BFSK-modulated input signal, and provides the down converted mixing signal to the band-pass filter unit 240. The quadrature (Q) mixer mixes a frequency fc−f of the BFSK-modulated input signal and the oscillator frequency $f_{LO}$ provided from the phase-locked loop (PLL) 220 to down convert the BFSK-modulated input signal, and provides the down converted mixing signal to the band-pass filter unit 240.

The band-pass filter unit 240 removes a signal having a lower frequency and a higher frequency than the frequency deviation 'Δf', and amplifies the signal at the frequency deviation 'Δf'.

Specifically, the band pass filter unit 240 includes a first band pass filter and a second band pass filter. The bandpass filter unit 240 performs bandpass filtering on the mixed signal down converted by the in-phase (I) mixer, and then provides it to the demodulator 250. Moreover, the bandpass filter unit 240 performs bandpass filtering on the mixed signal down converted by the quadrature (Q) mixer, and then provides it to the demodulator 250. For example, frequencies of the remaining frequency channels except for a spacer frequency '−f' of the first frequency channel and a mark frequency '+f' of the first frequency channel may be removed by the band pass filter unit 240.

The demodulator 250 includes a polyphase filter (PPF) 252, a first envelope detector (ED) 254, a second envelope detector 256, and a subtractor 258. The demodulator 250 demodulates a bandpass filtered signal provided from the bandpass filter unit 240 and provides the demodulated signal to the analog-to-digital converter 260.

The polyphase filter (PPF) 252 separates a positive frequency deviation '+Δf' from a negative frequency deviation '−Δf' by removing an image component from the bandpass filtered signal.

Specifically, the polyphase filter (PPF) 252 removes an image component from the bandpass filtered signal provided from each of the first bandpass filter and the second bandpass filter, and then provides a signal from which the image component is removed to the first envelope detector 254 and the second envelope detector 256, respectively.

The first envelope detector 254 obtains an energy of the positive frequency deviation '+Δf', and the second envelope detector 256 obtains an energy of the negative frequency deviation '−Δf'. For example, the first envelope detector 254 detects an envelope of a signal having a mark frequency of a first frequency channel and provides it to the subtractor 258. Moreover, the second envelope detector 256 detects an envelope of a signal having a spacer frequency of a first frequency channel and provides it to the subtractor 258.

The subtractor 258 obtains an energy difference between the energy of the positive frequency deviation '+Δf' and the negative frequency deviation '−Δf'.

Specifically, the subtractor 258 subtracts the envelope-detected signal provided from the second envelope detector 256 from the envelope-detected signal provided from the first envelope detector 254, and then provides the subtracted signal to the analog-to-digital converter 260.

The analog-to-digital converter 260 digitally converts the signal demodulated in the demodulator 250.

In operation, the BFSK modulated input signal input through an antenna has a frequency fc+f or a frequency fc−f. The input signal is amplified through the low noise amplifier 210, and a frequency of the amplified input signal is converted into a frequency deviation 'Δf' through the I/Q mixer 230 based on a frequency $f_{LO}$ corresponding to the selected channel. Here, the frequency $f_{LO}$ is generated through the fractional-N PLL in the same way as a transmitter. The frequency $f_{LO}$ corresponding to the selected channel is determined by an input digital bit of the delta-sigma modulator 221.

Thereafter, both an interference signal in a low frequency region and a signal in a high frequency region based on the frequency deviation 'Δf' are removed through a band pass filter (BPF), and a signal in a center of the frequency deviation 'Δf' is amplified. A receiver supporting a typical BFSK needs only a low-pass filter (LPF) from the same viewpoint.

Thereafter, the amplified signal is demodulated through the multiphase filter 252, the first envelope detector 254, the second envelope detector 256, and the subtractor 258. That is, the polyphase filter 252 distinguishes a positive frequency deviation '+Δf' and a negative frequency deviation '−Δf'. The first envelope detector 254 and the second envelope detector 256 obtain energy of positive frequency deviation '+Δf' and energy of negative frequency deviation '−Δf', respectively. The subtractor 258 provides the energy difference to the analog-to-digital converter 260. The demodulated signal is converted into a digital signal through the analog-to-digital converter 260.

As described above, according to the present invention, during FSK modulation, each of the frequency channels is divided into two or more tones, and tones corresponding to other frequency channels are allocated therebetween. Accordingly, it is possible to improve spectral efficiency while improving the BER performance in a fading channel by increasing a modulation index for a BFSK wireless communication system having a low data transmission rate.

Having described exemplary embodiments of the present invention, it is further noted that it is readily apparent to those of reasonable skill in the art that various modifications may be made without departing from the spirit and scope of the invention which is defined by the metes and bounds of the appended claims.

INDUSTRIAL APPLICABILITY

The FSK signal modulation/demodulation method and apparatus according to exemplary embodiments of the present invention may improve spectral efficiency while improving the BER performance in a fading channel by taking a large modulation index for a FSK wireless communication system having a low data transmission rate, particularly the BFSK wireless communication system. These characteristics are very suitable for a low-power long-distance wireless communication system with a large number of nodes.

What is claimed is:

1. A method for modulating/demodulating a frequency deviation keying (FSK) signal, the method comprising:
 (a) modulating an FSK signal by setting a frequency channel to be used;
 (b) generating a desired output frequency 'fout' compared to a reference frequency '$f_{REF}$' by adjusting a frequency division ratio (N+n) with respect to a frequency of the modulated FSK signal; and
 (c) amplifying the FSK signal having the generated output frequency 'fout' and radiating the amplified FSK signal through an antenna,
 wherein each of the frequency channels is divided into two or more tones, and different frequency channels are allocated between the tones divided into two or more tones,
 when the FSK signal is a binary frequency shift keying (BFSK) signal, wherein the step (a) comprises:
 (a-1) summing up a channel selection signal (CHSEL<15:0>) set to bits corresponding to the center frequency 'fc' of the channel to be used according to the channel method and an offset signal (OFFSET<8:0>) set to bit that sets the frequency deviation 'Δf' to 1 MHz;
 (a-2) subtracting the offset signal (OFFSET<8:0>) from the channel selection signal (CHSEL<15:00>); and
 (a-3) outputting either bits corresponding to a sum frequency 'fc+Δf' of the center frequency and a frequency deviation or bits corresponding to a difference frequency 'fc−Δf' between the center frequency and the frequency deviation 'Δf' according to a transmission data (TXDATA).

2. The method of claim 1, wherein the step (b) comprises:
 (b-1) converting a 16-bit modulated signal into a 3-bit modulated signal;
 (b-2) distributing a 3-bit modulated signal to an output frequency 'fout' to generate a division frequency 'fdiv';
 (b-3) detecting a phase by receiving the frequency division frequency 'fdiv' and a reference frequency '$f_{REF}$' provided from an external device;

(b-4) receiving a phase difference signal to charge-pump the phase difference signal; and
(b-5) removing a high-frequency component of the charge-pumped signal.

3. The method of claim 1, further comprising:
(d) amplifying the sum component of the center frequency 'fc' and the frequency deviation 'Δf' of the BFSK-modulated input signal input through an antenna and the difference component between the center frequency 'fc' and the frequency deviation 'Δf', respectively;
(e) lowering a frequency of the amplified sum component and difference component to the frequency deviation 'Δf' using an I/Q mixer with respect to the oscillator frequency '$f_{Lo}$' corresponding to the selected channel;
(f) removing a signal having a frequency lower than the frequency deviation 'Δf' and a signal having a higher frequency than the frequency deviation 'Δf' to amplify a signal at the frequency deviation 'Δf';
(g) demodulating the amplified signal; and
(h) analog-to-digital converting the demodulated signal.

4. The method of claim 3, wherein the step (g) comprises:
(g-1) separating a positive frequency deviation '+Δf' from a negative frequency deviation '−Δf' by removing an image component from a bandpass filtered signal;
(g-2) obtaining an energy of each of the positive frequency deviation '+Δf' and the negative frequency deviation '−Δf'; and
(g-3) obtaining an energy difference between the energy of the positive frequency deviation '+Δf' and the negative frequency deviation '−Δf'.

5. The method of claim 1, wherein the output frequency 'fout' is composed of the sum of the center frequency and the frequency deviation 'fc+Δf' and the difference between the center frequency and the frequency deviation 'fc−Δf', and
an interval of adjustable frequency of the center frequency is determined by dividing the reference frequency '$f_{REF}$' by a number of available digital bits.

6. An apparatus for modulating/demodulating a frequency deviation keying (FSK) signal, the apparatus comprising:
a channel selection-modulator modulating an FSK signal by setting a frequency channel to be used;
a phase locked loop generating a desired output frequency 'fout' compared to a reference frequency '$f_{REF}$' by adjusting a frequency division ratio (N+n) with respect to a frequency of the modulated FSK signal; and
an output unit amplifying the FSK signal having the generated output frequency 'fout' and radiating the amplified FSK signal through an antenna,
wherein each of the frequency channels is divided into two or more tones, and different frequency channels are allocated between the tones divided into two or more tones,
when the FSK signal is a binary frequency shift keying (BFSK) signal, wherein the channel selection-modulator comprises:
a summer summing up a channel selection signal (CHSEL<15:0>) set to bits corresponding to the center frequency 'fc' of the channel to be used according to the channel method and an offset signal (OFFSET<8:0>) set to bit that sets the frequency 'f' to 1 MHz;
a subtractor subtracting the offset signal (OFFSET<8:0>) from the channel selection signal (CHSEL<15:00>); and a multiplexer outputting either bits corresponding to a sum frequency 'fc+Δf' of the center frequency 'fc' and a frequency deviation 'Δf' or bits corresponding to a difference frequency 'fc−Δf' between the center frequency and the frequency deviation 'Δf' according to a transmission data (TXDATA).

7. The apparatus of claim 6, wherein the phase locked loop comprises:
a delta-sigma-modulator converting a 16-bit modulated signal into a 3-bit modulated signal;
a divider distributing a 3-bit modulated signal to an output frequency 'fout' to generate a division frequency 'fdiv';
a phase-frequency detector detecting a phase by receiving the frequency division frequency 'fdiv' and a reference frequency '$f_{REF}$' provided from an external device;
a charge pump receiving a phase difference signal to charge-pump the phase difference signal; and
a loop filter removing a high-frequency component of the charge-pumped signal.

8. The apparatus of claim 6, further comprising:
a low-noise amplifier amplifying the sum component of the center frequency 'fc' and the frequency deviation 'Δf' of the BFSK-modulated input signal input through an antenna and the difference component between the center frequency 'fc' and the frequency deviation 'Δf', respectively;
an I/Q mixer unit lowering a frequency of the amplified sum component and difference component to the frequency deviation 'Δf' using an I/Q mixer with respect to the oscillator frequency '$f_{LO}$' corresponding to the selected channel;
a band-pass filter unit removing a signal having a frequency lower than the frequency deviation 'Δf' and a signal having a higher frequency than the frequency deviation 'Δf' to amplify a signal at the frequency deviation 'Δf';
a demodulator demodulating the amplified signal; and
an analog-to-digital converter analog-to-digital converting the demodulated signal.

9. The apparatus of claim 8, wherein the demodulator further comprises:
a polyphase filter separating a positive frequency deviation '+Δf' from a negative frequency deviation '−Δf' by removing an image component from a bandpass filtered signal;
an envelope detector obtaining an energy of each of the positive frequency deviation '+Δf' and the negative frequency deviation '−Δf'; and
a subtractor obtaining an energy difference between the energy of the positive frequency deviation '+Δf' and the negative frequency deviation '−Δf'.

10. The apparatus of claim 6, wherein the output frequency 'fout' is composed of the sum of the center frequency and the frequency deviation 'fc+Δf' and the difference between the center frequency and the frequency deviation 'fc−Δf', and
an interval of adjustable frequency of the center frequency is determined by dividing the reference frequency '$f_{REF}$' by a number of available digital bits.

* * * * *